US011458420B2

(12) United States Patent
Sundström et al.

(10) Patent No.: US 11,458,420 B2
(45) Date of Patent: Oct. 4, 2022

(54) PURIFICATION OF OIL

(71) Applicant: RECONDOIL SWEDEN AB, Östersund (SE)

(72) Inventors: Fred Sundström, Östersund (SE); Thomas Persson, Östersund (SE)

(73) Assignee: Recondoil Sweden AB, Östersund (SE)

( * ) Notice: Subject to any disclaimer, the term of this patent is extended or adjusted under 35 U.S.C. 154(b) by 397 days.

(21) Appl. No.: 16/607,975

(22) PCT Filed: Apr. 24, 2018

(86) PCT No.: PCT/SE2018/050415
§ 371 (c)(1),
(2) Date: Oct. 24, 2019

(87) PCT Pub. No.: WO2018/199837
PCT Pub. Date: Nov. 1, 2018

(65) Prior Publication Data
US 2021/0101094 A1    Apr. 8, 2021

(30) Foreign Application Priority Data

Apr. 28, 2017  (SE) .................................. 1750514-0

(51) Int. Cl.
*B01D 17/04* (2006.01)
*B01D 17/12* (2006.01)
(Continued)

(52) U.S. Cl.
CPC ........... *B01D 17/047* (2013.01); *B01D 17/10* (2013.01); *B01D 17/12* (2013.01); *B01D 21/009* (2013.01);
(Continued)

(58) Field of Classification Search
CPC ...... B01D 17/047; B01D 17/10; B01D 17/12; B01D 21/0012; B01D 21/009; B01D 21/30; B01D 21/32; B01D 21/34; B01D 17/0214; C10G 33/04; C10G 33/06; C10G 33/08; C10G 2300/208
See application file for complete search history.

(56) References Cited

U.S. PATENT DOCUMENTS 2,023,988 A   12/1935  Bissell et al.
2,049,014 A   7/1936   McAfee et al.
(Continued)

FOREIGN PATENT DOCUMENTS

GB   1 450 673 A    9/1976
JP   S52-87655 U    6/1977
(Continued)

*Primary Examiner* — Renee Robinson
(74) *Attorney, Agent, or Firm* — Dilworth & Barrese, LLP

(57) ABSTRACT

A method and a system for purification of oil, said method comprising the steps of: —providing separation aid and oil to be purified to at least one sedimentation tank; —waiting for allowing a sludge phase to sediment to a bottom part of the sedimentation tank, said sludge phase comprising the separation aid together with impurities from the oil; —removing an oil phase not comprising said sludge phase from the at least one sedimentation tank; and —filtering said oil phase through a depth filter for removing any possible remaining separation aid and impurities.

26 Claims, 3 Drawing Sheets

(51) Int. Cl.
*C10G 33/04* (2006.01)
*C10G 33/06* (2006.01)
*C10G 33/08* (2006.01)
*B01D 17/00* (2006.01)
*B01D 21/00* (2006.01)
*B01D 21/32* (2006.01)
*B01D 21/30* (2006.01)

(52) U.S. Cl.
CPC ......... *B01D 21/0012* (2013.01); *B01D 21/30* (2013.01); *B01D 21/32* (2013.01); *C10G 33/04* (2013.01); *C10G 33/06* (2013.01); *C10G 33/08* (2013.01); *C10G 2300/208* (2013.01)

(56) References Cited

U.S. PATENT DOCUMENTS

| | | | |
|---|---|---|---|
| 4,741,840 A * | 5/1988 | Atherton | C10G 55/06 210/771 |
| 5,587,065 A * | 12/1996 | Burns | B01D 21/0012 210/104 |
| 6,379,549 B1 | 4/2002 | Lepoder et al. | |
| 2003/0000895 A1 * | 1/2003 | Hensley | C02F 1/40 210/670 |
| 2009/0078632 A1 * | 3/2009 | Gallo | C02F 9/00 210/178 |
| 2014/0332473 A1 | 11/2014 | Haberman et al. | |
| 2015/0265955 A1 | 9/2015 | Kanchi et al. | |
| 2016/0264442 A1 | 9/2016 | Knoop | |

FOREIGN PATENT DOCUMENTS

| | | |
|---|---|---|
| JP | S55-31868 A | 3/1980 |
| JP | S56-104993 A | 8/1981 |
| JP | S60-135484 A | 7/1985 |
| JP | S64-75007 A | 3/1989 |
| JP | 2003-200009 A | 7/2003 |
| JP | 2011-104510 A | 6/2011 |
| JP | 2013-060573 A | 4/2013 |
| WO | 95/14752 A1 | 6/1995 |
| WO | 2005/111181 A1 | 11/2005 |

\* cited by examiner

PURIFICATION OF OIL

TECHNICAL FIELD OF THE INVENTION

The present invention relates to a method and a system for purification of Oil.

BACKGROUND OF THE INVENTION

Purification of contaminated oils, such as for example mineral oil, industrial oils, processing oils or hydraulic oils, is important for the possibility to reuse the oils and therefore an important factor for the environmental future and the limited nature resources of oils. The contaminated oil can be purified, or recovered, by means of a liquid two-phase separation process, wherein a liquid separation aid is added to the oil and mixed therewith. Impurities will be captured by the separation aid and will accumulate in a bottom phase. There is still a need to improve the purification process for contaminated oils.

SUMMARY

It is an object of the present invention to provide an improved method and system for the purification of oil.

This is achieved in a method and a system and a computer program according to the independent claims.

Hereby by filtering the oil phase after sedimentation any possible remaining separation aid and impurities in the oil can be removed and an improved purification of the oil is achieved.

In one aspect of the invention a method for purification of oil is provided. Said method comprises the steps of:
  providing separation aid and oil to be purified to at least one sedimentation tank;
  waiting for allowing a sludge phase to sediment to a bottom part of the sedimentation tank, said sludge phase comprising the separation aid together with impurities from the oil;
  removing an oil phase not comprising said sludge phase from the at least one sedimentation tank; and
  filtering said oil phase through a depth filter for removing any possible remaining separation aid and impurities.

In another aspect of the invention a system for purification of oil is provided. Said system comprises:
  at least one feed tank comprising oil to be purified;
  a separation aid dosing device;
  at least one sedimentation tank comprising at least one inlet connected to the at least one feed tank for receiving oil to be purified and to the separation aid dosing device for receiving separation aid, said sedimentation tank further comprising at least one oil phase outlet for removing an oil phase from the sedimentation tank after sedimentation of a sludge phase to a bottom part of the sedimentation tank, said sludge phase comprising the separation aid together with impurities from the oil; and
  a filter module connected to the oil phase outlet of the at least one sedimentation tank, wherein said filter module comprises a depth filter.

In still another aspect of the invention a computer program product is provided. Said computer program comprising instructions which, when executed in a processor in a control system in a system for purification of oil, cause the control system to perform the method according to the invention.

Hereby also very small impurity particles in the oil can be effectively filtered out form the oil phase. A combination of the depth filter and any remaining separation aid which will get caught in the depth filter will improve the efficiency for removal of small impurity particles. A depth filter is a filter which can retain impurities within a bulk structure of the filter medium in contrast to conventional thin layer surface filters which only filter at the surface. The depth filter will absorb any remaining separation aid and contaminations and the absorbed separation aid will also be able to catch small contamination particles from the oil and hereby improve filter efficiency.

In one embodiment of the invention said filtering is performed by adding a cellulose fiber powder to a part of said oil phase and circulating said part of said oil phase over a carrier layer for building up a depth filter, also called a filter cake, and wherein the remaining part of the oil phase then is filtered through the depth filter. Said filter module is also configured for such type of filtering. Hereby a very effective, flexible, easy and cost efficient depth filtering is achieved. The depth filter is easy to change between batches of oil to purify and this type of depth filter is very effective for the removal of small particles. Furthermore an automation of the process can easily be achieved, both for the building up of the filter cake and for the changing of the filter. Furthermore the size, i.e. the depth of the depth filter can very easily be changed from case to case by just adopting the amount of added cellulose fiber powder.

In one embodiment of the invention the method further comprises the step of mixing and warming the oil and separation aid when provided into the sedimentation tank.

In one embodiment of the invention the at least one sedimentation tank further comprises a mixing device, at least one temperature sensor and at least one heating device configured for heating the content of the sedimentation tank in dependence of the temperature(s) measured by the at least one temperature sensor.

Hereby separation effectivity can be improved.

In one embodiment of the invention the method further comprises measuring a temperature of the content in the sedimentation tank in at least one position in the sedimentation tank and controlling the warming of the content in the sedimentation tank in dependence of said measured at least one temperature.

In one embodiment of the invention the method further comprises the step of warming the oil phase removed from the sedimentation tank in a heating tank before the step of filtering. Hereby the filtering can be more effective.

In one embodiment of the invention the method further comprises detecting the presence of an oil phase or a sludge phase in at least one position in the sedimentation tank by at least one content detection sensor provided in the tank and controlling the removing of the oil phase in dependence of said detection, said controlling being performed by a control system connected to sensors, pumps and valves in the system. Hereby it can be assured that only oil phase is removed through the oil phase outlet.

In one embodiment of the invention the step of detecting comprises detecting if it is an oil phase or a sludge phase at substantially the level in the sedimentation tank where an oil phase outlet is provided.

In one embodiment of the invention the method further comprises removing at least a part of the sludge phase from the sedimentation tank before another batch of contaminated oil to be purified is provided to the sedimentation tank.

In one embodiment of the invention at least a part of the sludge phase settled in the bottom part of the sedimentation tank in a previous purification cycle performed in the sedimentation tank is reused in a next purification cycle where oil to be purified is provided into the sedimentation tank, whereby the sludge phase is mixed into the newly provided oil by a mixing device provided in the sedimentation tank possibly together with an amount of new separation aid corresponding to an amount of removed separation aid in the sludge phase removed from the previous purification cycle. It is economically beneficial to reuse the separation aid and hereby also a larger amount of separation aid can be used for each cleaning cycle. This will improve purification efficiency.

In one embodiment of the invention the method further comprises controlling removal of a sludge phase from the sedimentation tank through at least one sludge phase outlet while monitoring an output from a content detection sensor provided at substantially the same level as an oil phase outlet of the sedimentation tank and stop the removal of a sludge phase when the output from the content detection sensor indicates that an oil phase instead of a previous sludge phase is provided at the level of the oil phase outlet. Hereby the position of an interphase between an oil phase and a sludge phase can be controlled and it can be assured that only oil phase is removed from the sedimentation tank through the oil phase outlet.

In one embodiment of the invention the method further comprises providing oil to be purified to one sedimentation tank while removing and filtering an oil phase from another sedimentation tank which has been provided with oil to be purified in a previous cycle of the purification process, while possibly also allowing a sludge phase to sediment to a bottom part of a third sedimentation tank which has already been provided with oil to be purified in a previous cycle of the purification process.

In one embodiment of the invention the method further comprises controlling feed of oil to be purified into at least two sedimentation tanks provided in the system and removal of purified oil phase from the at least two sedimentation tanks cyclic such that a continuous flow of oil in and out form the system is provided, said controlling being provided by a control system provided in the system connected to sensors, valves and pumps in the system.

Hereby oil to be purified can be continuously provided into the system and purified oil phase can continuously be removed out from the system. Hereby the system can be used as an online system for continuous purification of oil.

In one embodiment of the invention said system further comprises:
  a control system connected to sensors, pumps and valves in the system and configured for controlling flows in the system in dependence of predefined settings, sensor signals and possibly also user inputs.

In one embodiment of the invention the at least one sedimentation tank further comprises at least one content detection sensor for detecting the presence of an oil phase or a sludge phase in at least one position in the sedimentation tank and wherein said control system is configured for controlling the removing of the oil phase form the sedimentation tank in dependence of said detection.

In one embodiment of the invention said sedimentation tank comprises a content detection sensor provided at substantially the same level in the sedimentation tank as an oil phase outlet of the sedimentation tank and said content detection sensor is configured for detecting if it is an oil phase or a sludge phase at this level in the sedimentation tank. Hereby it can be assured that only oil phase is removed through the oil phase outlet.

In one embodiment of the invention the system further comprises at least one sludge tank connected to at least one sludge removal outlet in a bottom part of the at least one sedimentation tank and configured for receiving a sludge phase from the sedimentation tank.

In one embodiment of the invention the sedimentation tank comprises at least two sludge removal outlets provided at different levels in the bottom part of the sedimentation tank, both connected to the at least one sludge tank. Hereby the user can chose which part of the sludge phase he wants to remove and which part he wants to keep in the tank for reuse. For example the lowermost bottom part of the sludge phase could be kept for reuse.

Hereby a heavier fraction of the sludge phase can be kept in the tank for reuse and a lighter fraction of the sludge phase could be removed.

In one embodiment of the invention the system further comprises a heating tank provided between the oil phase outlet of the at least one sedimentation tank and the filter module.

In one embodiment of the invention a control system provided in the system is configured for controlling removal of a sludge phase from the sedimentation tank through the at least one sludge phase outlet while monitoring an output from a content detection sensor provided at substantially the same level as an oil phase outlet of the sedimentation tank and stop the removal of a sludge phase when the output from the sensor indicates that an oil phase instead of a previous sludge phase is provided at the level of the oil phase outlet.

In one embodiment of the invention the system further comprises at least two sedimentation tanks connected in parallel in the system.

In one embodiment of the invention the system comprises a control system connected to sensors, pumps and valves of the system and configured for controlling feeding of oil to be purified into the at least two sedimentation tanks and removal of oil phase from the at least two sedimentation tanks such that one sedimentation tank is receiving oil to be purified while the oil phase is removed from another sedimentation tank and possibly while the sedimentation process is going on in a third sedimentation tank.

DETAILED DESCRIPTION OF EMBODIMENTS

Figure 1:
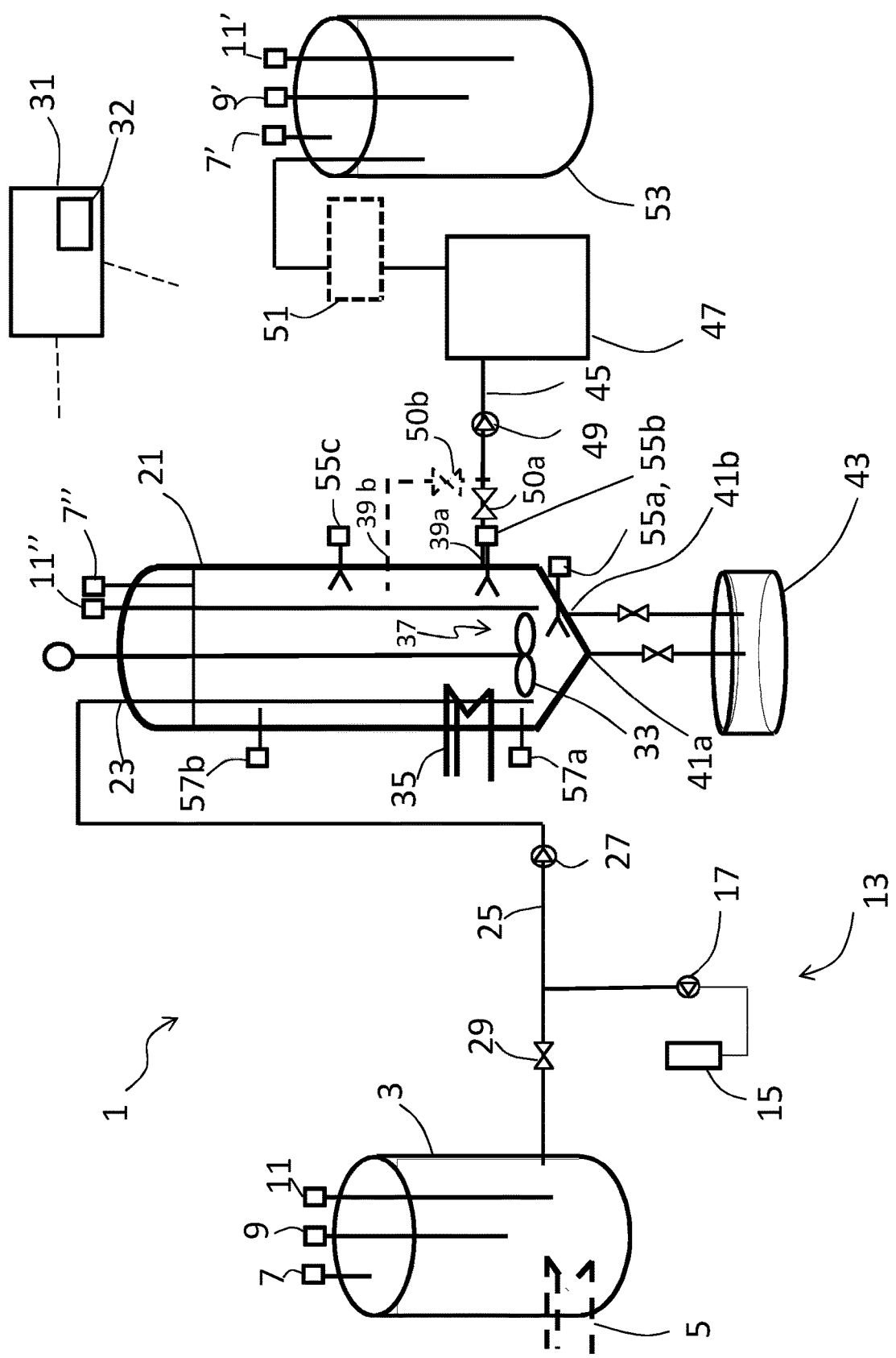
FIG. 1 shows schematically a system for purification of oil according to one embodiment of the invention.

FIG. 1 shows schematically a system 1 for purification of oil according to one embodiment of the invention. The system 1 comprises a feed tank 3 comprising oil to be purified. The system 1 could as well comprise more than one feed tank 3. The feed tank 3 can comprise a heating device 5 however this is not necessary. The feed tank 3 can also optionally comprise different sensors, such as here shown, a level switch 7, which will close an inlet to the feed tank and/or initiate an alarm when the content in the feed tank 3 has reached a certain level. Other sensors which optionally can be provided in the feed tank 3 are one or more temperature sensors 9, measuring the temperature of the content in the feed tank at one or more levels and a level sensor 11 which can detect to which level in the feed tank oil has been provided. The system 1 comprises further a separation aid dosing device 13 comprising a separation aid tank 15 and a separation aid pump 17. The use of a separation aid, also called a chemical booster, for capturing impurities in contaminated oil has been described before as discussed above. A liquid separation aid is added to the oil and mixed therewith and impurities in the oil will be captured by the separation aid and will accumulate in a bottom phase.

The separation aid will by chemical interactions absorb contaminating solids, or dissolved impurities in the contaminated target oil. The separation aid should be liquid at the temperature at which the process is carried out. The separation aid composition should be substantially insoluble in the contaminated target oil, forming a two-phase mixture upon mixing with the contaminated oil. The liquid separation aid should also have a density different from that of the contaminated oil to be purified.

The separation aid is not soluble in the contaminated target oil because of its polar properties and thus colloids consisting of small droplets of the liquid separation aid composition are formed by the stirring, which through chemical interactions (hydrophilic, hydrophobic, and charge interactions) may absorb unwanted solid or the dissolved impurities in the contaminated target oil. In instances where the separation aid has a higher density than the oil the separation aid will at a gravity separation form a lower phase together with the solid and/or dissolved impurities. In instances where the separation aid has a lower density than the contaminated target oil, it will form an upper phase on gravity separation.

The liquid separation aid for use in the invention will generally be made up based on the following components: a) a polar polymer; b) a hydrotrope/solubilizer; and, c) a co-tenside.

Suitable separation aids with the properties described above, that can be used in the inventive process, may e.g. constitute a composition comprising a mixture of polar polymers such as polyethylene glycols, polypropylene glycols or similar polyalkylene glycols, organic surface active components with nonionic, anionic, cationic and amphoteric properties with the ability to enhance the solubility of solid or dissolved impurities in to the separation aid.

One example of a separation aid which can be used in this invention comprise: a) at least one polar polymer not soluble in oil and with a higher density than the oil, such as polyethylene glycol with an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); c) at least one amphoteric Co-surfactant, such as an propionate type e.g. Ampholak YJH-40 (Akzo Nobel) which is a sodium caprylimino dipropionate.

The system 1 of the invention comprises further at least one sedimentation tank 21. In this embodiment of the invention one sedimentation tank 21 is provided in the system. The sedimentation tank 21 comprises at least one inlet 23 connected to the feed tank 3 and the separation aid dosing device 13 by at least one fluid connection 25. Alternatively separate inlets and fluid connections for oil to be purified and separation aid into the sedimentation tank 21 can be provided. A pump 27 is suitably provided in the fluid connection 25 for pumping oil and separation aid into the sedimentation tank 21. One or more valves 29 can also be provided in the fluid connection 25 for allowing control of the fluid flow into the sedimentation tank 21. A control system 31 is also provided in this embodiment of the system 1. The control system 31 is connected to pumps, valves and sensors in the system for allowing control of the system. The connections between the control system 31 and all the pumps, valves and sensors in the system are not shown. They are just illustrated by two dotted lines from the control system 31. The connections could be both wired connections or wireless connections. Further details of the control system will be given below.

Oil to be purified and separation aid is according to the method of the invention provided from the feed tank 3 and from the separation aid dosing device 13 into the sedimentation tank 21. In this embodiment of the invention the oil and the separation aid can be mixed by a mixing device 33 provided in the sedimentation tank 21 and the content of the sedimentation tank 21 can also be heated by a heating device 35 of the sedimentation tank 21. The heating device 35 can for example be in the form of hot water tubes provided inside or outside the tank. The separation aid will capture impurities in the oil and form a phase together with the impurities called a sludge phase which will sink to a bottom part 37 of the sedimentation tank 21. Hereby, by gravity settling two phases will be formed in the sedimentation tank 21 after some time, one oil phase and one sludge phase. Warming up the content in the sedimentation tank by the heating device 35 may improve separation efficiency.

The sedimentation tank 21 comprises further at least one oil phase outlet 39 for removing the oil phase from the sedimentation tank 21 after sedimentation of the sludge phase to the bottom part 37 of the sedimentation tank 21. In one embodiment of the invention two or more oil phase outlets are provided at different levels in the sedimentation tank 21. Two oil phase outlets 39*a*, 39*b* are shown in the system of FIG. 1, one with dotted lines for showing that it is optional. When two oil phase outlets 39*a*, 39*b* are provided at different levels in the sedimentation tank the oil phase can be removed from the sedimentation tank from two different levels. In this embodiment it is indicated that the oil phase outlets are provided through a wall of the sedimentation tank 21. Another option would be to provide the oil phase outlet(s) as one or more suction pipes pointing down inside the sedimentation tank from the top of the tank. A movable/extendable pipe could also be an option. Hereby the oil phase outlet 39 could be provided at any desired level inside the sedimentation tank 21. The sedimentation tank 21 comprises also suitably at least one sludge removal outlet in the bottom part 37. In the embodiment shown in FIG. 1 the sedimentation tank 21 comprises two sludge removal outlets 41*a*, 41*b* provided at different levels in the bottom part 37 of the sedimentation tank 21. The two sludge removal outlets 41*a*, 41*b* are both connected to a sludge tank 43. The use of two sludge removal outlets 41*a*, 41*b* provided at different levels of the tank allows a convenient way to be able to choose to either remove the whole sludge phase or to remove a part of the sludge phase and store a certain amount of sludge phase in the sedimentation tank 21 for reuse in a next purification cycle. The separation aid in the sludge phase can often be reused for further purification and that is suitable for economic reasons. By providing one sludge removal outlet 41*b* at a level slightly above the lowest point of the tank a user can chose which part of the sludge he wants to keep in the tank for reuse. For example the heaviest fraction of the sludge can be kept in the tank while a lighter fraction of the sludge can be removed. The heaviest fraction of the sludge can possibly be the fraction best suitable for reuse. However, in another embodiment only one sludge removal outlet is provided.

According to the invention a filter module 51 is connected to the at least one oil phase outlet 39a, 39b of the sedimentation tank 21 such that possible remaining impurities and separation aid in the oil phase removed from the sedimentation tank can be filtered out by the filter module 51. The filter module 51 is provided in a fluid connection 45 between the oil phase outlets 39a, 39b and a product tank 53. The product tank 53 hereby receives the oil phase from the sedimentation tank 21 after it has been filtered in the filter module 51. Any possible remaining impurities and separation aid in the oil phase will be kept in the filter module 51. In this embodiment of the invention a heating tank 47 is also provided in the fluid connection 45 between the oil phase outlet 39 of the sedimentation tank 21 and the filter module 51. The heating tank 47 is not necessary for the invention but heating the oil phase before the filtration may improve filtration efficiency. The fluid connection 45 will furthermore comprise at least one pump 49 and suitably at least one valve 50a, 50b into each one of the oil phase outlets 39a, 39b. The filter module 51 can comprise for example a depth filter, a capillary filter and/or a standard filter, for example based on paper and having different filtration grades and/or a water absorbent filter. Oil will pass through the filter but separation aid and impurities will get trapped by the filter.

A depth filter can be especially suitable for the filtering step according to this invention. A depth filter is a filter that retains impurities within a bulk structure of the filter medium in contrast to filtering only on the surface as in a conventional thin layer surface filter. An advantage with depth filtering is a high dirt holding capacity without clogging due to greater total filter mass. Using cellulose fiber powder as filter medium enables absorption and removal of both polar liquid separation aid and water together with solid particles. By decreasing the filtering rate the contact time will increase giving a high separation efficiency.

In one embodiment of the invention the filter module 51 is configured for providing a new depth filter for each batch of purified oil received from the sedimentation tank 21 to be filtered. This provides the advantage that a new fresh depth filter is used each time. A depth filter will also be very effective for filtering out very small particles, here called micro and nano sized particles which are in the size of µm or smaller. When reusing an industrial oil over and over again it will become more and more important to also be able to get rid of the smallest particles when purifying the oil for the reuse. Otherwise the amount of the smallest particles will grow and they will become an increasing problem in the oil the more times the oil has been purified for reuse. The combination of the separation aid as used in the present invention for the purification of the oil and the use of a depth filter is especially effective for the removal of the smallest contamination particles in the oil because separation aid possibly left in the oil phase and possibly bound to some impurities/contamination from the oil will be absorbed in the depth filter, possibly in a top layer of the depth filter. The separation aid itself which is absorbed in the depth filter will during the filtering of the oil phase attract and bind even the smallest impurity particles. Hereby the depth filtering will filter out impurities from the oil phase and the separation aid will also be caught in the depth filter and will contribute to the capturing of the smallest impurity particles in the oil phase which is filtered through the depth filter.

One example of a depth filter which can be used in the present invention is a depth filter which is built up for each batch of oil phase to be purified. A cellulose fiber powder is mixed into a first small amount of the oil phase to be purified. This mix of cellulose fiber powder and oil phase is then passed over a carrier layer, for example a disposable carrier paper or a reusable carrier layer material, a number of times. A depth filter, also called a filter cake, made up of these cellulose fibers is hereby built on the carrier layer. When the depth filter has been built up the rest of the oil phase is passed over the depth filter. Any left separation aid will be caught by the depth filter. Furthermore other remaining impurities in the oil phase will be caught by the depth filter and even the smallest micro and nano sized particles will to a high degree get caught, as explained above by the help of the separation aid which has been absorbed in the depth filter. The forcing of the oil phase through the depth filter can be provided in different ways, for example by providing a pressure from above or a vacuum from below the carrier layer. After the filtering of one batch of oil phase the depth filter can be disposed of and a new can be provided by the same procedure as described above. This type of depth filter using a cellulose fiber powder for building a depth filter is a very cost effective type of filtering. Furthermore it is a very flexible filtering method because the thickness of the filter can be easily adapted from time to time by changing amount of cellulose fiber powder to add for building the filter. It is also very easy to change filter from time to time, for example between each batch of oil phase to purify and both this changing of filter and the process for building the filter can easily be provided as an automated process.

Tests have been performed for measuring the effectiveness of filtering using a depth filter in combination with the purification method using the separation aid as described above. From these tests it is clear that small seized particles are very effectively removed by this method. Details are given below from three example tests:

1. A hydraulic mineral oil, Fuchs/Statoil Hydraway HVXA 68, which had been used in a hydraulic paper bale press machine was cleaned both by a conventional KLEENTEK Electrostatic filter and by the method according to the invention and the particle content of the cleaned oil was measured according to ISO-code 4406:99 where particle seizes are >4 µm/>6 µm/>14 µm. The result from conventional cleaning was 18/17/13 and from cleaning according to the invention: 14/13/10.
2. A synthetic Gearbox oil, ExxonMobil MobilGearSHC XMP320, which had been used in a wind power plant gearbox was cleaned both by conventional C.C. JENSEN Fine Filter 3 µm/0.8 µm and by the method according to the invention and the particle content of the cleaned oil was measured according to ISO-code 4406:99 where particle seizes are >4 µm/>6 µm/>14 µm. The result from conventional cleaning was 20/18/13 and from cleaning according to the invention: 13/12/9.
3. A mineral Metal cutting oil, Castrol Honilo 981, which had been used in a cylinder honing process was cleaned both by conventional TRANSORFILTER Backflushed paper filter rods 1 µm and by the method according to the invention and the particle content of the cleaned oil was measured according to ISO-code 4406:99 where particle seizes are >4 µm/>6 µm/>14 µm. The result from conventional cleaning was 25/29/19 and from cleaning according to the invention: 13/11/9.

The product tank 53 can comprise similar sensors as the feed tank 3, such as a level switch 7', a temperature sensor 9' and a level sensor 11'. However, these sensors are not necessary for the invention. Also the sedimentation tank 21 can comprise a level switch 7" and a level sensor 11".

Figure 2:
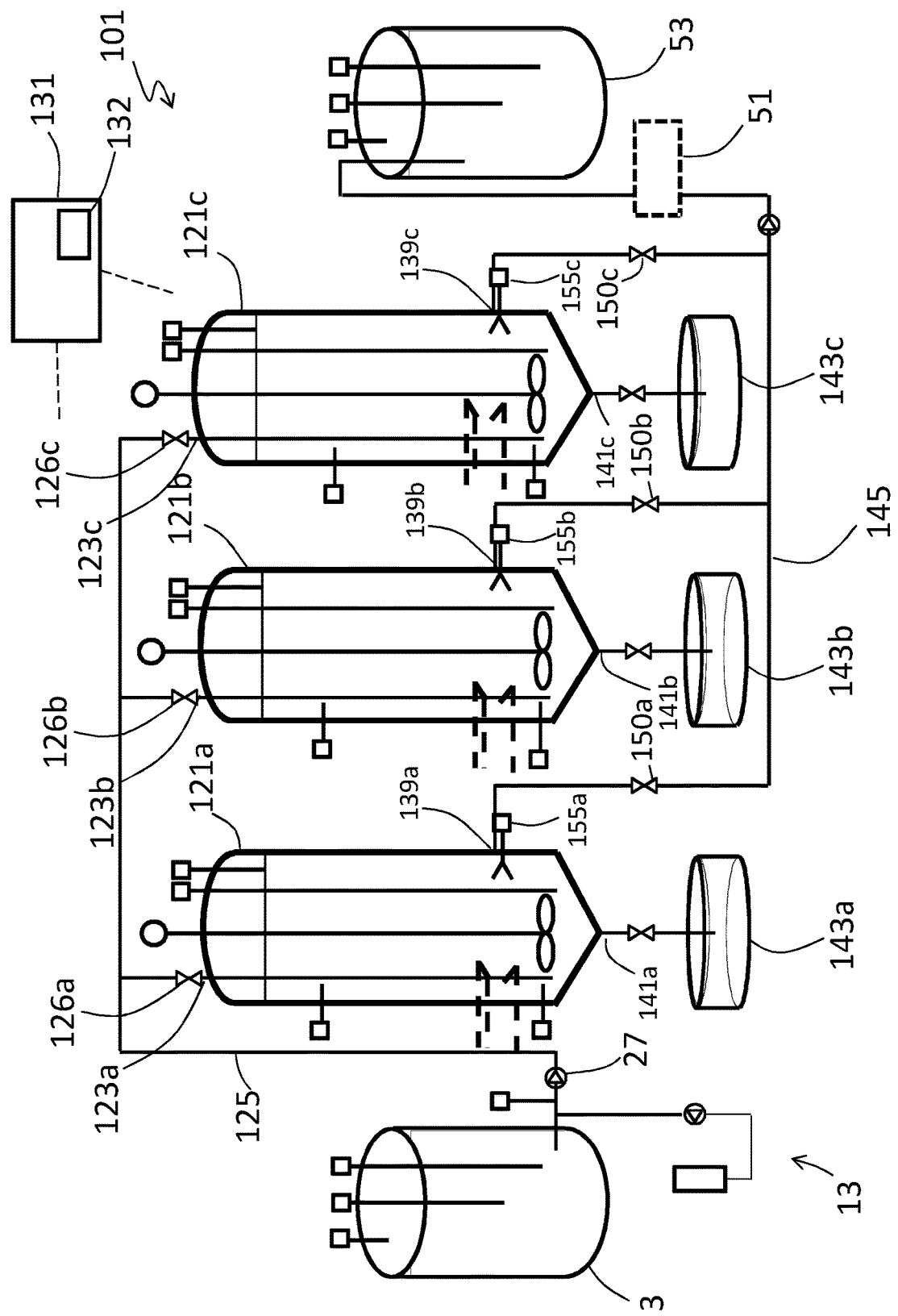
FIG. 2 shows schematically a system for purification of oil according to another embodiment of the invention comprising three parallel sedimentation tanks.

The sedimentation tank 21 comprises further in this embodiment, but not necessarily, at least one content detection sensor 55 for detecting the presence of an oil phase or a sludge phase in at least one position in the sedimentation tank 21. The content detection sensor 55 could for example be a guided wave radar, which is a long wire attached to the top of the tank, hanging inside the tank almost all the way down to the bottom of the tank. Such a guided wave radar can provide information about where an interface between two phases are located by comparing reflected microwave pulses which will differ when the wire is provided in different environments. In the embodiment shown in FIG. 1 however three content detection sensors 55a, 55b, 55c are provided. They are provided at different levels inside the sedimentation tank 21 wherein one content detection sensor 55a is provided at a position within the sedimentation tank such that it will always be provided in the sludge phase, one content detection sensor 55b is provided at substantially the same level within the sedimentation tank as one of the oil phase outlets 39a and one content detection sensor 55c is provided at a position within the sedimentation tank 121 such that it will always be provided in the oil phase. Hereby the sensor output from the content detection sensor 55b provided substantially at the same level as the oil phase outlet 39a can be compared with the output from the other two content detection sensors 55a, 55c to know if there is an oil phase or a sludge phase at the position of that content detection sensor 55b. However, another possibility which is shown in FIG. 2 would be to provide only one content detection sensor 155a,b,c at substantially the same level as the oil phase outlet 139a,b,c and compare the sensor output with beforehand known values for such sensor output when provided in oil phase and in sludge phase. These content detection sensors 55a-c, 155a-c could for example be based on measuring dielectric properties or density properties of the content.

The control system 31 of the system 1 is configured for controlling the removing of the oil phase form the sedimentation tank 21 in dependence of said detection by the content detection sensors 55a-c. Hereby the control system is connected to the content detection sensor/sensors 55, 55a, 55b, 55c and to the pump 49 and possible valves in the fluid connection 45 between the oil phase outlet 39 and the product tank 53. If a content detection sensor 55b (155a-c in FIG. 2) which is provided substantially at the same level as the oil phase outlet 39a initially indicates the presence of sludge phase the control system 31 in one embodiment of the invention first controls the system to remove sludge from the sedimentation tank 21 through one of the at least one sludge phase outlets 41a, 41b while at the same time the control system is monitoring an output from the content detection sensor 55b which is provided at substantially the same level as the oil phase outlet 39a. Sludge should then be removed until the sensor output changes and indicates that an oil phase is provided at substantially the level of the oil phase outlet 39a. At this point the sludge removal is paused and oil phase is instead removed through the oil phase outlet 39a. Suitably the oil phase outlet 39a is provided just above the content detection sensor 55b and hereby it can be assured that no sludge phase will be transferred out from the sedimentation tank 21 through the oil phase outlet 39a.

The sedimentation tank 21 comprises further in this embodiment at least one temperature sensor 57a, 57b. In the embodiment of FIG. 1 two temperature sensors 57a, 57b are shown positioned at different levels within the sedimentation tank 21. However another number of temperature sensors could as well be provided. The control system 31 can be connected to both the temperature sensors 57a, 57b and the heating device 35 in the sedimentation tank 21 hereby allowing control of the heating device 35 and heating of the content in the sedimentation tank in dependence of the temperature(s) measured by the at least one temperature sensor 57a, 57b. By providing temperature sensors at different levels inside the sedimentation tank 21 the heating of the tank content can be optimized and a uniform temperature can be provided to all the content in the tank. Furthermore sensor outputs can be adjusted in dependence of measured temperatures.

The control system 31 provided in the system 1 can suitably be connected to all the pumps, valves and sensors of the system for allowing control of flows in the system in dependence of sensor outputs. The control system can control a suitable volume of oil to be purified to be transferred from the feed tank 3 into the sedimentation tank 21. Furthermore the control system 31 can control the separation aid dosing device 13 to transfer a suitable amount of separation aid to the sedimentation tank 21. The amount of separation aid can depend on for example if a part of the sludge phase in a previous purification cycle has been left in the sedimentation tank 21 for reuse as described above. The control system 31 can further control when an oil phase is ready for being removed from the sedimentation tank through the oil phase outlet 39. This could be after a predefined time period or in dependence of sensor outputs from content detection sensor/sensors 55, 55a, 55b, 55c if such sensors are provided and/or from temperature sensors 57a, 57b. Furthermore the control system 31 controls removing of a sludge phase from the sedimentation tank 21 as described above. The control system is configured for controlling flows in the system in dependence of predefined settings, sensor signals and possibly also user inputs.

A computer program product is furthermore provided. Said computer program comprising instructions which, when executed in a processor 32 in the control system 31 in the system 1 for purification, cause the control system to control the flows in the system as described above. The computer program comprises at least instructions, which when executed in the processor 32 in the control system 31, cause the control system to control the system to:

provide separation aid and oil to be purified to at least one sedimentation tank;

wait for allowing a sludge phase to sediment to a bottom of the sedimentation tank, said sludge phase comprising the separation aid together with impurities from the oil;

remove an oil phase not comprising said sludge phase from the at least one sedimentation tank; and filter said oil phase for removing any possible remaining separation aid and impurities.

The computer program optionally also comprises instructions, which when executed in the processor 32 in the control system 31, cause the control system to:

mix and warm the oil and separation aid when provided into the sedimentation tank; and/or control the system to measure a temperature of the content in the sedimentation tank in at least one position in the sedimentation tank and control the warming of the content in the sedimentation tank in dependence of said measured at least one temperature; and/or warm the oil phase removed from the sedimentation tank in a heating tank before the step of filtering; and/or detect the presence of an oil phase or a sludge phase in at least one position in the sedimentation tank by content detection sensors provided in the tank and control the removing of the oil phase in dependence of said detection, said controlling being performed by a control system connected to sensors, pumps and valves in the system; and/or remove at least a part of the sludge phase from the sedimentation tank before another batch of contaminated oil to be purified is provided to the sedimentation tank; and/or reuse at least a part of the sludge phase settled in the bottom part of the sedimentation tank in a previous purification cycle performed in the sedimentation tank in a next purification cycle where oil to be purified is provided into the sedimentation tank, whereby the sludge phase is mixed into the newly provided oil by a mixing device provided in the sedimentation tank possibly together with an amount of new separation aid corresponding to an amount of removed separation aid in the sludge phase removed from the previous purification cycle.

FIG. 2 shows schematically a system 101 for purification of oil according to another embodiment of the invention comprising three parallel sedimentation tanks 121a, 121b, 121c. The number of parallel tanks can vary in dependence of the wanted capacity of the system, for example two, four, five or even more sedimentation tanks can be provided in the system 101. The sedimentation tanks 121a, 121b, 121c are here shown to be almost identical to the sedimentation tank 21 in FIG. 1 and will not be described in detail. One difference is that in this embodiment only one content detection sensor 155a,b,c is provided in each sedimentation tank 121a-c. As described above this requires that comparing values for the sensor output have been stored in the control system 131. Herby the content in the tank can be identified from an output from the content detection sensor 155a,b,c. However, more than one content detection sensor, for example three content detection sensors could be provided in each one of the sedimentation tanks 121a, 121b, 121c as described above in relation to FIG. 1. Each sedimentation tank is in this embodiment connected to a sludge tank 143a, 143b, 143c by only one sludge phase outlet 141a,b,c. However also in this embodiment two sludge phase outlets could be provided to each sedimentation tank as described above in relation to FIG. 1. A feed tank 3, a separation aid dosing device 13, a filter module 51 and a product tank 53 are the same as in the embodiment described in relation to FIG. 1 and will not be further described here. A heating tank 47 could also in this embodiment be provided between the oil phase outlets and the filter module 51. A fluid connection 125 is provided between the feed tank 3 and branches out to an inlet 123a, 123b, 123c of each of the sedimentation tanks 121a, 121b, 121c in the system 101. A pump 27 is provided in the fluid connection 125 and valves 126a, 126b, 126c are provided for allowing control of fluid into each one of the sedimentation tanks 121a, 121b, 121c. Furthermore a fluid connection 145 is provided between the product tank 53 and oil phase outlets 139a, 139b, 139c of the sedimentation tanks 121a, 121b, 121c, i.e. there are branches of the fluid connection 145 entering each one of the oil phase outlets 139a, 139b, 139c. In this embodiment only one oil phase outlet is provided for each of the sedimentation tanks. However more than one oil phase outlets can be provided and they can be provided either through the wall of the sedimentation tanks or as one or more tubes pointing down through the tank from the top of the tank as described above. Furthermore a pump 49 is provided in the fluid connection 145 and one valve 150a, 150b, 150c connected to each one of the oil phase outlets 139a, 139b, 139c of the sedimentation tanks 121a, 121b, 121c. Hereby it is possible to control from which sedimentation tank an oil phase is removed by controlling the pump and the valves 150a, 150b, 150c from a control system 131. As in the previous embodiment a filter module 51 is provided in the fluid connection 145 between the oil phase outlets 139a, 139b, 139c and the product tank 53.

A control system 131 is provided in the system and is connected to pumps, valves and sensors of the system for allowing control of the fluid flows in dependence of predefined settings, sensor outputs and possibly also user input as described above in relation to the embodiment described in FIG. 1. All the connections are not shown but can be provided by wire or wirelessly. In this embodiment of the invention the control system 131 is further configured to, and comprises a computer program comprising instructions which when run on a processor 132 in the control system causes the control system to, control feeding of oil to be purified into the at least two sedimentation tanks 121a, 121b, 121c and removal of oil phase from the at least two sedimentation tanks 121a, 121b, 121c such that one sedimentation tank is receiving oil to be purified while the oil phase is removed from another sedimentation tank and possibly while the sedimentation process is going on in a third sedimentation tank. Hereby oil to be purified can be provided to one sedimentation tank while removing and filtering an oil phase from another sedimentation tank which has been provided with oil to be purified in a previous cycle of the purification process. If three sedimentation tanks are provided in the system a sludge phase can at the same time be allowed to sediment to a bottom part of a third sedimentation tank which has already been provided with oil to be purified in a previous cycle of the purification process.

The control system 131 of the system can be configured for controlling feed of oil to be purified into at least two sedimentation tanks provided in the system and removal of purified oil phase from the at least two sedimentation tanks cyclic such that a continuous flow of oil in and out form the system is provided. Hereby the system 101 can be used as an online system for continuous purification of oil, i.e. oil to be purified can be continuously provided to the feed tank 3 and purified oil can be continuously retrieved form the product tank 53 and the system 101 can be connected in a process where oil continuously is used and continuously needs to be purified. Hereby the oil levels in a system which is connected to a system for purification of oil according to the invention can be kept at a constant level during the oil purification process.

Figure 3:
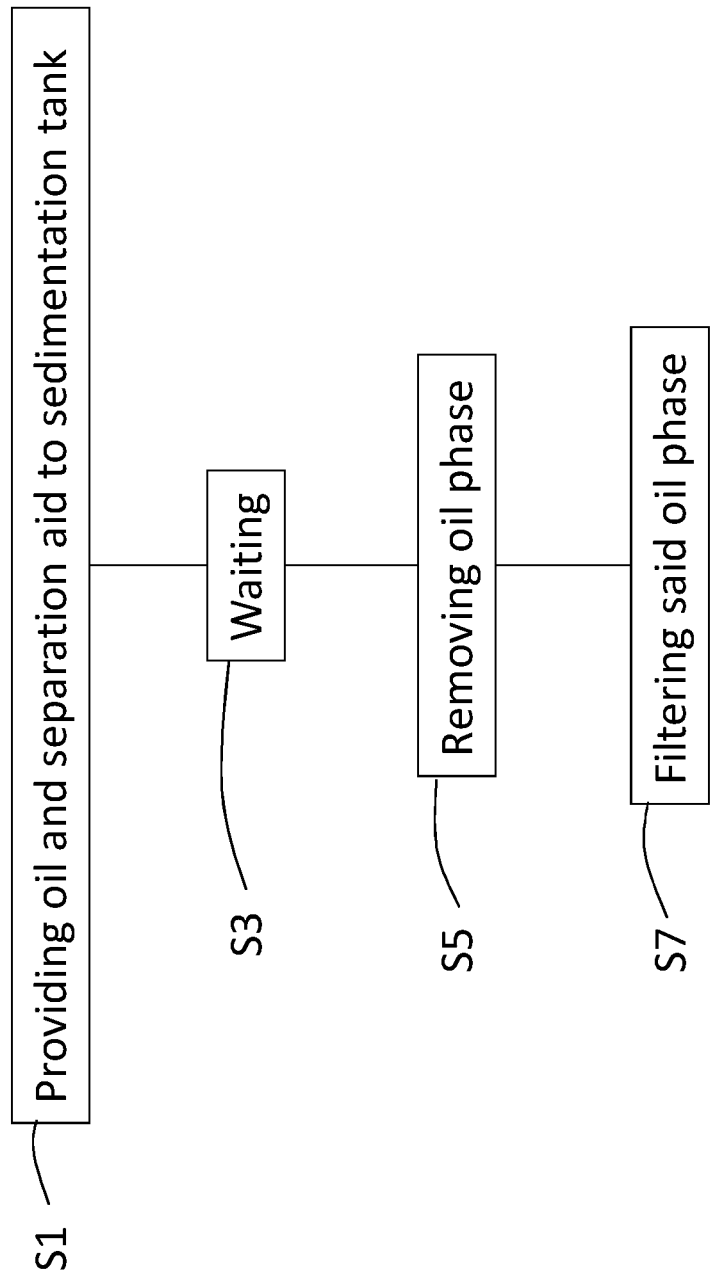
FIG. 3 is a flow chart of a method according to one embodiment of the invention.

FIG. 3 is a flow chart of the method according to one embodiment of the invention. The steps of the method are described in order below:

S1: Providing separation aid and oil to be purified to at least one sedimentation tank 21; 121a, 121b, 121c.

S3: Waiting for allowing a sludge phase to sediment to a bottom part 37 of the sedimentation tank 21; 121a, 121b, 121c, said sludge phase comprising the separation aid together with impurities from the oil.

S5: Removing an oil phase not comprising said sludge phase from the at least one sedimentation tank 21; 121a, 121b, 121c.

S7: Filtering through a depth filter said oil phase for removing any possible remaining separation aid and impurities. Said filtering is performed in a filter module 51 connected to at least one oil phase outlet 39a, 39b; 139a, 139b, 139c of the at least one sedimentation tank 21; 121a, 121b, 121c.

The method can also optionally comprise one or more of the following method steps:

mixing and warming the oil and separation aid when provided into the sedimentation tank;

measuring a temperature of the content in the sedimentation tank in at least one position in the sedimentation tank and controlling the warming of the content in the sedimentation tank in dependence of said measured at least one temperature;

warming the oil phase removed from the sedimentation tank in a heating tank before the step of filtering;

detecting the presence of an oil phase or a sludge phase in at least one position in the sedimentation tank 21; 121a, 121b, 121c by content detection sensors 55; 55a, 55b, 55c provided in the sedimentation tank and controlling the removing of the oil phase in dependence of said detection, said controlling being performed by a control system 31; 131 connected to sensors, pumps and valves in the system;

removing at least a part of the sludge phase from the sedimentation tank before another batch of contaminated oil to be purified is provided to the sedimentation tank; and/or reusing at least a part of the sludge phase settled in the bottom part of the sedimentation tank in a previous purification cycle performed in the sedimentation tank in a next purification cycle where oil to be purified is provided into the sedimentation tank, whereby the sludge phase is mixed into the newly provided oil by a mixing device provided in the sedimentation tank possibly together with an amount of new separation aid corresponding to an amount of removed separation aid in the sludge phase removed from the previous purification cycle.

In one embodiment of the invention said filtering is performed by adding a cellulose fiber powder to a part of said oil phase and circulating said part of said oil phase over a carrier layer for building up a depth filter and wherein the remaining part of the oil phase then is filtered through the depth filter.

In one embodiment of the invention the method further comprises controlling removal of a sludge phase from the sedimentation tank 21; 121a-c through at least one sludge phase outlet 41a,b; 141a-c while monitoring an output from a content detection sensor 55b; 155a-c provided at substantially the same level as an oil phase outlet 39a; 139a-c of the sedimentation tank 21; 121a-c and stop the removal of a sludge phase when the output from the sensor 55b; 155a-c indicates that an oil phase instead of a previous sludge phase is provided at the level of the oil phase outlet 39a; 139a-c. The sludge removal is then paused while the oil phase instead is removed from the sedimentation tank 21; 121a-c through the oil phase outlet 39a; 139a-c. After the oil phase has been removed more sludge phase can be removed. Hereby, by removing sludge phase while monitoring the sensor output the level of an interphase between an oil phase and a sludge phase can be controlled to be provided at the same level as the oil phase outlet before a removing of an oil phase is started. Hereby substantially the whole oil phase can be removed from the advanced sedimentation tank in a convenient way and very little oil will be wasted. Suitably the oil phase outlet 39a; 139a-c is provided just above the content detection sensor 55b; 155a-c.

In one embodiment of the invention the method further comprises providing oil to be purified to one sedimentation tank 121a, 121b, 121c while removing and filtering an oil phase from another sedimentation tank 121a, 121b, 121c which has been provided with oil to be purified in a previous cycle of the purification process, while possibly also allowing a sludge phase to sediment to a bottom part of a third sedimentation tank 121a, 121b, 121c which has already been provided with oil to be purified in a previous cycle of the purification process. As described above a continuous oil purification process is hereby achieved.

The invention claimed is:

1. A method for purification of oil, said method comprising the steps of:

providing a separation aid from a separation aid dosing device (13) and oil to be purified from at least one feed tank (3) to at least one sedimentation tank (21; 121a, 121b, 121c), the separation aid being liquid at temperature at which said method is carried out and will by chemical interaction absorb contaminating solids or dissolved impurities in the oil to be purified, being substantially insoluble in the oil to be purified due to polar properties, and having a different density from the oil to be purified;

mixing said separation aid and said oil to be purified, to form a two-phase mixture;

absorbing contaminating solids or dissolved impurities from the oil to be purified, by chemical interaction with said separation aid;

waiting to allow a sludge phase to sediment to a bottom part (37) of the sedimentation tank (21; 121a, 121b, 121c), said sludge phase comprising the separation aid together with impurities from the oil;

removing an oil phase not comprising said sludge phase from the at least one sedimentation tank through at least one oil phase outlet (39a, 39b; 139a, 139b 139c) of the sedimentation tank; and filtering through a depth filter of cellulose fiber powder, said oil phase for removing any possible remaining separation aid and impurities.

2. A method according to claim 1, wherein said filtering is performed by adding a cellulose fiber powder to a part of said oil phase and circulating said part of said oil phase over a carrier layer for building up a depth filter and the remaining part of the oil phase then is filtered through the depth filter.

3. A method according to claim 1, further comprising the step of mixing and warming the oil and separation aid when provided into the sedimentation tank (21; 121a, 121b, 121c).

4. A method according to claim 3, further comprising measuring a temperature of the content in the sedimentation tank (21; 121a, 121b, 121c) in at least one position in the sedimentation tank and controlling the warming of the content in the sedimentation tank in dependence of said measured at least one temperature.

5. A method according to claim 1, further comprising the step of warming the oil phase removed from the sedimentation tank in a heating tank (47) before the step of filtering.

6. A method according to claim 1, further comprising detecting the presence of an oil phase or a sludge phase in at least one position in the sedimentation tank by at least one content detection sensor (55a, 55b, 55c; 155a, 155b, 155c) provided in the tank and controlling the removing of the oil phase in dependence of said detection, said controlling being performed by a control system (31; 131) connected to sensors, pumps and valves.

7. A method according to claim 6, wherein the step of detecting comprises detecting if it is an oil phase or a sludge phase at substantially the level in the sedimentation tank where an oil phase outlet (39a, 39b; 139a, 139b, 139c) is provided.

8. A method according to claim 1, further comprising removing at least a part of the sludge phase from the sedimentation tank (21; 121a, 121b, 121c) before another batch of contaminated oil to be purified is provided to the sedimentation tank.

9. A method according to claim 1, comprising providing oil to be purified to one sedimentation tank (121a, 121b, 121c) while removing and filtering an oil phase from another sedimentation tank (121a, 121b, 121c) which has been provided with oil to be purified in a previous cycle of the purification process.

10. A method according to claim 1, further comprising controlling feed of oil to be purified into at least two sedimentation tanks (121a, 121b, 121c) and removal of purified oil phase from the at least two sedimentation tanks (121a, 121b, 121c) cyclic such that a continuous flow of oil is provided, said controlling being provided by a control system (131) connected to sensors, valves and pumps.

11. A method according to claim 1, wherein the separation aid comprises a polar polymer, a hydrotrope/solubilizer, and a co-tenside.

12. A method for purification of oil, said method comprising the steps of:
providing separation aid and oil to be purified to at least one sedimentation tank (21; 121a, 121b, 121c);
waiting for allowing a sludge phase to sediment to a bottom part (37) of the sedimentation tank (21; 121a, 121b, 121c), said sludge phase comprising the separation aid together with impurities from the oil;
removing an oil phase not comprising said sludge phase from the at least one sedimentation tank; and
filtering through a depth filter said oil phase for removing any possible remaining separation aid and impurities, wherein
at least a part of the sludge phase settled in the bottom part (37) of the sedimentation tank (21; 121a, 121b, 121c) in a previous purification cycle performed in the sedimentation tank is reused in a next purification cycle where oil to be purified is provided into the sedimentation tank, whereby the sludge phase is mixed into the newly provided oil by a mixing device (33) provided in the sedimentation tank.

13. A method according to claim 12, wherein the sludge phase is mixed into the newly provided oil by the mixing device (33) provided in the sedimentation tank together with an amount of new separation aid corresponding to an amount of removed separation aid in the sludge phase removed from the previous purification cycle.

14. A method according to claim 12, comprising allowing a sludge phase to sediment to a bottom part of a third sedimentation tank (121a, 121b, 121c) which has already been provided with oil to be purified in a previous cycle of the purification process.

15. A method for purification of oil, said method comprising the steps of:
providing separation aid and oil to be purified to at least one sedimentation tank (21; 121a, 121b, 121c);
waiting for allowing a sludge phase to sediment to a bottom part (37) of the sedimentation tank (21; 121a, 121b, 121c), said sludge phase comprising the separation aid together with impurities from the oil;
removing an oil phase not comprising said sludge phase from the at least one sedimentation tank; and
filtering through a depth filter said oil phase for removing any possible remaining separation aid and impurities, wherein
the method further comprises controlling removal of a sludge phase from the sedimentation tank (21; 121a, 121b, 121c) through at least one sludge phase outlet (41a, 41b; 141a, 141b, 141c) while monitoring an output from a content detection sensor (55b; 155a, 155b, 155c) provided at substantially the same level as an oil phase outlet (39a; 139a, 139b, 139c) of the sedimentation tank and stop the removal of a sludge phase when the output from the content detection sensor indicates that an oil phase instead of a previous sludge phase is provided at the level of the oil phase outlet.

16. A system (1; 101) for purification of oil, said system comprising:
at least one feed tank (3) comprising oil to be purified;
a separation aid dosing device (13);
at least one sedimentation tank (21; 121a, 121b, 121c) comprising at least one inlet (23; 123a, 123b, 123c) connected to the at least one feed tank (3) for receiving oil to be purified and to the separation aid dosing device (13) for receiving the separation aid,
said sedimentation tank (21; 121a, 121b, 121c) further comprising at least one oil phase outlet (39a, 39b; 139a, 139b, 139c) for removing an oil phase from the sedimentation tank after sedimentation of a sludge phase to a bottom part (37) of the sedimentation tank, said sludge phase comprising the separation aid together with impurities from the oil; and
a filter module (51) connected to the at least one oil phase outlet (39a, 39b; 139a, 139b, 139c) of the at least one sedimentation tank (21; 121a, 121b, 121c), wherein said filter module (51) comprises a depth filter, wherein
a control system (31; 131) provided in the system (1; 101) is configured for controlling removal of a sludge phase from the sedimentation tank (21; 121a, 121b, 121c) through the at least one sludge phase outlet (41a, 41b; 141a, 141b, 141c) while monitoring an output from a content detection sensor (55b; 155a, 155b, 155c) provided at substantially the same level as the oil phase outlet (39a; 139a, 139b, 139c) of the sedimentation tank and stop the removal of a sludge phase when the output from the content detection sensor (55b; 155a, 155b, 155c) indicates that an oil phase instead of a previous sludge phase is provided at the level of the oil phase outlet (39a; 139a, 139b, 139c).

17. A system according to claim 16, wherein said filter module (51) is configured for adding a cellulose fiber powder to a part of said oil phase and circulating said part of said oil phase over a carrier layer for building up the depth filter and said filter module (51) further is configured for filtering the remaining part of the oil phase through the depth filter.

18. A system according to claim 16, wherein: the control system (31; 131) is further connected to sensors, pumps and valves in the system and configured for controlling flows in the system in dependence of predefined settings, sensor signals and user inputs.

19. A system according to claim 16, further comprising at least one sludge tank (43; 143a, 143b, 143c) connected to at least one sludge removal outlet (41a, 41b; 141a, 141b, 141c) in a bottom part (37) of the at least one sedimentation tank (21; 121a, 121b, 121c) and configured for receiving a sludge phase from the sedimentation tank.

20. A system according to claim 19, wherein the sedimentation tank (21) comprises at least two sludge removal outlets (41a, 41b) provided at different levels in the bottom part (37) of the sedimentation tank, both connected to the at least one sludge tank (43).

21. A system according to claim 16, wherein the at least one sedimentation tank (21; 121a, 121b, 121c) further comprises a mixing device (33), at least one temperature sensor (57a, 57b) and at least one heating device (35) configured for heating the content of the sedimentation tank in dependence of the temperature(s) measured by the at least one temperature sensor.

22. A system according to claim 16, wherein the system further comprises a heating tank (47) provided between the at least one oil phase outlet (39a, 39b) of the at least one sedimentation tank (21) and the filter module (51).

23. A system according to claim 16, further comprising at least two sedimentation tanks (121a, 121b, 121c) connected in parallel in the system (101).

24. A system according to claim 23, wherein the control system (131) is connected to sensors, pumps and valves of the system (101) and configured for controlling feeding of oil to be purified into the at least two sedimentation tanks (121a, 121b, 121c) and removal of oil phase from the at least two sedimentation tanks such that one sedimentation tank is receiving oil to be purified while the oil phase is removed from another sedimentation tank.

25. A system according to claim 24, wherein the control system (131) is configured for controlling feeding of oil to be purified, such that one sedimentation tank is receiving oil to be purified while the oil phase is removed from another sedimentation tank and while the sedimentation process is going on in a third sedimentation tank.

26. A system according to claim 13, wherein the separation aid comprises a polar polymer, a hydrotrope/solubilizer, and a co-tenside.

* * * * *